(12) United States Patent
Haseko et al.

(10) Patent No.: US 10,739,176 B2
(45) Date of Patent: Aug. 11, 2020

(54) FLOW RATE SENSOR HAVING TEMPERATURE DETECTORS AND HEAT ELEMENT PROVIDED ON DIFFERENT INSULATOR LAYERS OF DIAPHRAGM PART

(71) Applicants: Yoshihiro Haseko, Tokyo (JP); Yota Yamamoto, Tokyo (JP)

(72) Inventors: Yoshihiro Haseko, Tokyo (JP); Yota Yamamoto, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 150 days.

(21) Appl. No.: 15/759,570

(22) PCT Filed: Sep. 23, 2016

(86) PCT No.: PCT/JP2016/077980
§ 371 (c)(1),
(2) Date: Mar. 13, 2018

(87) PCT Pub. No.: WO2017/057176
PCT Pub. Date: Apr. 6, 2017

(65) Prior Publication Data
US 2019/0154484 A1   May 23, 2019

(30) Foreign Application Priority Data
Sep. 30, 2015   (JP) .................................. 2015-194417

(51) Int. Cl.
*G01F 1/688* (2006.01)
*G01F 1/692* (2006.01)
(Continued)

(52) U.S. Cl.
CPC ............ *G01F 1/692* (2013.01); *G01F 1/6845* (2013.01); *G01F 15/006* (2013.01); *G01K 7/16* (2013.01)

(58) Field of Classification Search
CPC ......... G01F 1/684; G01F 1/6845; G01F 1/692
(Continued)

(56) References Cited

U.S. PATENT DOCUMENTS 6,127,914 A * 10/2000 Sasaki ................. C23C 14/0676
338/22 R
6,333,270 B1   12/2001 Sasaki
(Continued)

FOREIGN PATENT DOCUMENTS

EP   0285451   10/1988
EP   1882912   1/2008
(Continued)

OTHER PUBLICATIONS

Japanese Office Action for 2015-194417 dated Jul. 23, 2019.
(Continued)

*Primary Examiner* — Eric S. McCall
(74) *Attorney, Agent, or Firm* — IPUSA, PLLC

(57) ABSTRACT

A disclosed flow rate sensor has a heat element and a plurality of temperature detectors, and in a state in which the heat element generates heat, a flow rate of a fluid flowing on the temperature detectors is detected, based on temperature detection results of each of the temperature detectors. The flow rate sensor includes a semiconductor substrate having a frame shape with an opening, a diaphragm part provided on the semiconductor substrate, and the heat element and the plurality of temperature detectors provided on the diaphragm part. The diaphragm part has a thin film structure (Continued)

part that covers the opening, and in a plan view, the plurality of temperature detectors are arranged in a periphery of the heat element.

26 Claims, 7 Drawing Sheets

(51) Int. Cl.
    *G01F 1/684* (2006.01)
    *G01F 15/00* (2006.01)
    *G01K 7/16* (2006.01)
(58) Field of Classification Search
    USPC .................................................... 73/114.34
    See application file for complete search history.

(56) References Cited

U.S. PATENT DOCUMENTS

| | | | |
|---|---|---|---|
| 6,470,742 | B1 | 10/2002 | Yamakawa et al. |
| 2004/0103720 | A1 | 6/2004 | Chou |
| 2005/0238080 | A1 | 10/2005 | Wolkin et al. |
| 2008/0168650 | A1 | 7/2008 | Sakuma |
| 2009/0000372 | A1 | 1/2009 | Matsumoto et al. |
| 2014/0284753 | A1* | 9/2014 | Ishitsuka ................... G01F 1/69 257/467 |
| 2017/0221959 | A1* | 8/2017 | Udrea ....................... G01J 5/20 |

FOREIGN PATENT DOCUMENTS

| | | |
|---|---|---|
| EP | 1944585 | 7/2008 |
| JP | H11-330051 | 11/1999 |
| JP | 2004-061412 | 2/2004 |
| JP | 2006-162423 | 6/2006 |
| JP | 2006-258678 | 9/2006 |
| JP | 2007-521637 | 8/2007 |
| JP | 2008-170382 | 7/2008 |
| JP | 2010-085171 | 4/2010 |
| WO | 2005/043624 | 5/2005 |
| WO | 2012/172528 | 12/2012 |

OTHER PUBLICATIONS

International Search Report for PCT/JP2016/077980 dated Oct. 25, 2016.
Extended European search report for European Patent Application No. 16851350.5 dated Sep. 19, 2018.
Japanese Office Action for 2015-194417 dated Apr. 2, 2019.
Japanese Office Action for 2015-194417 dated Oct. 29, 2019.
European Office Action for European Patent Application No. 16851350.5 dated Jan. 15, 2020.

* cited by examiner

US 10,739,176 B2

FLOW RATE SENSOR HAVING TEMPERATURE DETECTORS AND HEAT ELEMENT PROVIDED ON DIFFERENT INSULATOR LAYERS OF DIAPHRAGM PART

TECHNICAL FIELD

The present invention relates to a flow rate sensor.

BACKGROUND ART

Conventionally, there are known flow rate sensors that measure flow rates of fluids, such as air, or the like. Such flow rate sensors include a thermopile type using thermocouple for a temperature sensor, a resistance variation type using polysilicon for the temperature sensor, or the like, for example. In addition, there is a proposal to use, for the temperature sensor, vanadium oxide having a resistance with a high temperature coefficient (refer to Patent Document 1, for example).

PRIOR ART DOCUMENTS

Patent Documents

Patent Document 1: Japanese Patent No. 4299303

DISCLOSURE OF THE INVENTION

Problem to be Solved by the Invention

However, although suitable materials or the like for use in the temperature sensor were conventionally studied, suitable arrangements for the temperature sensor (temperature detector) when measuring the flow rate of the fluid were not sufficiently studied. For this reason, a detection sensitivity of the flow rate may not be sufficiently high.

The present invention is conceived in view of the above points, and one object of the present invention is to provide a flow rate sensor that can improve the detection sensitivity of the flow rate by suitably arranging the temperature detector.

Means of Solving the Problem

A disclosed flow rate sensor (1) has a heat element (40) and a plurality of temperature detectors (30 through 33), and in a state in which the heat element (40) generates heat, a flow rate of a fluid flowing on the temperature detectors (30 through 33) is detected, based on temperature detection results of each of the temperature detectors (30 through 33), and the flow rate sensor includes a semiconductor substrate (10) having a frame shape with an opening (10x), a diaphragm part (20) provided on the semiconductor substrate (10), and the heat element (40) and the plurality of temperature detectors (30 through 33) provided on the diaphragm part (20), wherein the diaphragm part (20) has a thin film structure part (20t) that covers the opening (10x), and in a plan view, the plurality of temperature detectors (30 through 33) are arranged in a periphery of the heat element (40).

Reference numerals in brackets above are added to facilitate understanding, and merely show examples, and are not limited to embodiments illustrated in the drawings.

Effects of the Invention

According to the disclosed technology, it is possible to provide a flow rate sensor that can improve the detection sensitivity of the flow rate by suitably arranging the temperature detector.

MODE OF CARRYING OUT THE INVENTION

Figure 1:
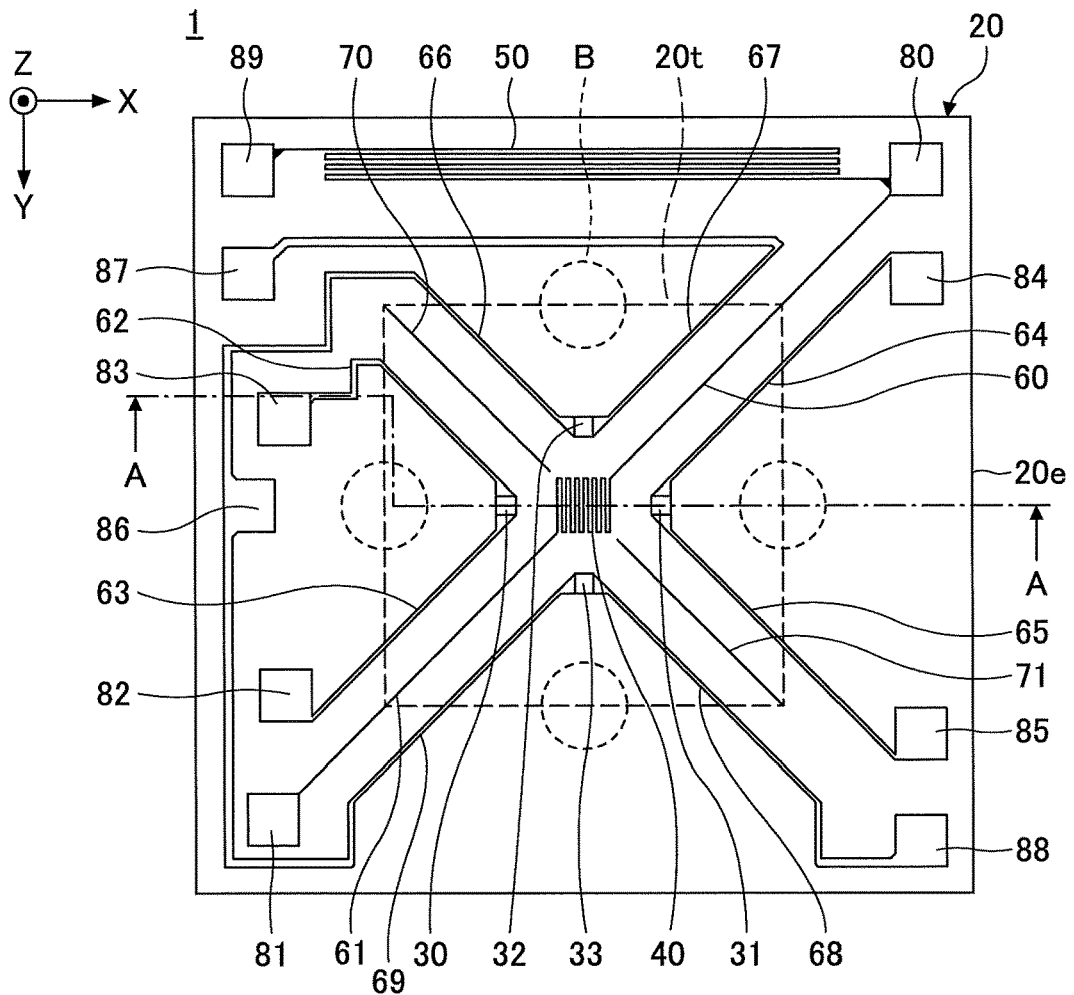
FIG. 1 is a perspective plan view illustrating an example of a flow rate sensor in a first embodiment.

Embodiments of the present invention will be described hereunder, by referring to the drawings. In each of the figures, identical constituent parts are designated by identical reference numerals, and repeated description of the same constituent parts may be omitted.

First Embodiment

[Structure of Flow Rate Sensor]

Figure 2:
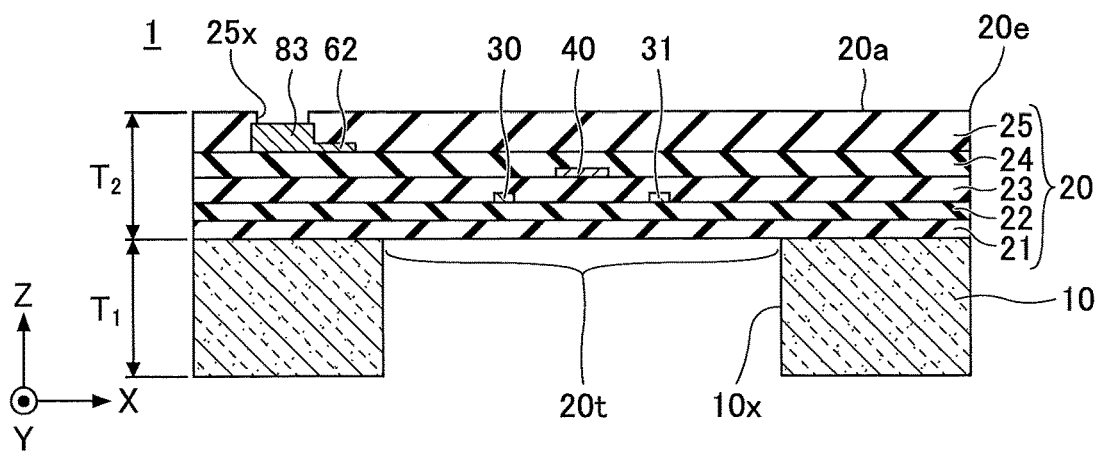
FIG. 2 is a cross sectional view along a line A-A in FIG. 1.

FIG. 1 is a perspective plan view illustrating an example of a flow rate sensor in a first embodiment, and FIG. 2 is a cross sectional view along a line A-A in FIG. 1.

As illustrated in FIG. 1 and FIG. 2, a flow rate sensor 1 in the first embodiment has a semiconductor substrate 10, a diaphragm part 20, X-axis temperature detectors 30 and 31, Y-axis temperature detectors 32 and 33, a heat element 40, a resistance thermometer sensor 50, wirings 60 through 69, dummy wirings 70 and 71, and pads (bonding pads) 80 through 89.

The flow rate sensor 1 is a sensor that detects a flow rate of a fluid flowing on the temperature detectors, in a state in which the heat element 40 generates heat, based on temperature detection results of the temperature detectors (the X-axis temperature detectors 30 and 31, and the Y-axis temperature detectors 32 and 33). However, the flow rate sensor 1 can also detect a flow direction and a flow velocity.

For example, the flow rate sensor 1 may be used for flow rate control of an air conditioner, flow rate control of air within an automobile engine, or the like.

The semiconductor substrate 10 is formed to a frame shape (picture frame shape) having an opening 10x. For example, a silicon substrate (Si substrate), a SOI (Silicon-On-Insulator) substrate, or the like may be used for the semiconductor substrate 10.

The diaphragm part 20 has a structure in which insulator layers 21 through 25 are successively stacked, and is provided on the semiconductor substrate 10 so as to cover the opening 10x. A planer shape of the diaphragm part 20 is a square shape, for example. A region (region covering the opening 10x) of the diaphragm part 20, not in contact with the semiconductor substrate 10 in particular, will be referred to as a thin film structure part 20t. A planar shape of the thin film structure part 20t is a square shape, for example. The thin film structure part 20t has a small heat capacity because the thin film structure part 20t is not in contact with the semiconductor substrate 10, and the thin film structure part 20t has a structure according to which the temperature easily rises.

In FIG. 1 and FIG. 2, an axis parallel to one of four edges 20e of a top surface 20a of the diaphragm part 20 is the X-axis, an axis perpendicular to the X-axis within a plane parallel to the top surface 20a of the diaphragm part 20 is the Y-axis, and a thickness direction of the diaphragm part 20 is the Z-axis. The X-axis, the Y-axis, and the Z-axis are perpendicular to each other. A plan view refers to a view of an object from a normal direction to the top surface 20a of the diaphragm part 20. In addition, the planar shape refers to a shape of the object viewed from the normal direction to the top surface 20a of the diaphragm part 20.

For the sake of convenience, FIG. 2 illustrates a thickness $T_1$ of the semiconductor substrate 10 and a thickness $T_2$ of the diaphragm part 20 as if the two are approximately the same. Actually, the thickness $T_1$ of the semiconductor substrate 10 is relatively thick, and the thickness $T_2$ of the diaphragm part 20 is relatively thin. The thickness $T_1$ of the semiconductor substrate 10 may be on the order of 50 to 300 μm, for example. The thickness $T_2$ of the diaphragm part 20 may be on the order of 0.5 to 5 μm, for example.

The flow rate sensor 1 may be used in a state fixed on a substrate. In this case, turbulence is generated when the fluid hits a sidewall of the flow rate sensor 1 (mainly a sidewall of the semiconductor substrate 10), and it may not be possible to accurately detect the flow rate. From this viewpoint, the thickness $T_1$ of the semiconductor substrate 10 is preferably thin. By making the thickness $T_1$ of the semiconductor substrate 10 thin, it becomes possible to reduce a step between the substrate and the semiconductor substrate 10, and reduce the generation of the turbulence.

In the diaphragm part 20, the X-axis temperature detectors 30 and 31, and the Y-axis temperature detectors 32 and 33, are provided on the insulator layer 22. The X-axis temperature detectors 30 and 31, and the Y-axis temperature detectors 32 and 33, are covered by the insulator layer 23 that functions as a protection layer. The heat element 40 and the resistance thermometer sensor 50 are formed on the insulator layer 23 in a meander shape, for example. The heat element 40 and the resistance thermometer sensor 50 are formed in the meander shape, in order to set the heat element 40 and the resistance thermometer sensor 50 to large resistances. The heat element 40 and the resistance thermometer sensor 50 are covered by the insulator layer 24 that functions as a protection layer.

The wirings 60 through 69, the dummy wirings 70 and 71, and the pads 80 through 89 are provided on the insulator layer 24. Predetermined wirings among the wirings 60 through 69 are connected to the heat element 40, the X-axis temperature detectors 30 and 31, the Y-axis temperature detectors 32 and 33, and the resistance thermometer sensor 50 are connected via vertical wirings (not illustrated) formed in the insulator layers 23 and 24. The wirings 60 through 69, the dummy wirings 70 and 71, and the pads 80 through 89 are covered by the insulator layer 25 that functions as a protection layer. At least a portion of a top surface of the pads 80 through 89 is exposed within an opening 25x provided in the insulator layer 25, to enable connection of the flow rate sensor 1 to an outside.

The X-axis temperature detectors 30 and 31 are formed on a line parallel to the X-axis. The Y-axis temperature detectors 32 and 33 are formed on a line parallel to the Y-axis. The X-axis temperature detectors 30 and 31 form a part for detecting a temperature change in the X-axis direction, and the Y-axis temperature detectors 32 and 33 forma part for detecting a temperature change in the Y-axis direction. The X-axis temperature detectors 30 and 31, and the Y-axis temperature detectors 32 and 33 may be formed from vanadium oxide, for example.

One end of the X-axis temperature detector 30 is connected to the pad 83 via the wiring 62, and the other end of the X-axis temperature detector 30 is connected to the pad 82 via the wiring 63. In addition, one end of the X-axis temperature detector 31 is connected to the pad 84 via the wiring 64, and the other end of the X-axis temperature detector 31 is connected to the pad 85 via the wiring 65.

The pad 82 and the pad 84 connect outside the flow rate sensor 1. In addition, the pad 83 connects to ground (or a power supply) outside the flow rate sensor 1, and the pad 85 connects to the power supply (or the ground) outside the flow rate sensor 1. Accordingly, the X-axis temperature detector 30 and the X-axis temperature detector 31 are connected in series between the ground and the power supply, and an intermediate potential can be obtained from a node part between the pad 82 and the pad 84.

One end of the Y-axis temperature detector 32 is connected to the pad 87 via the wiring 67, and the other end of the Y-axis temperature detector 32 is connected to the pad 86 via the wiring 66. In addition, the pad 86 is connected to one end of the Y-axis temperature detector 33 via the wiring 69, and the other end of the Y-axis temperature detector 33 is connected to the pad 88 via the wiring 68. In other words, the Y-axis temperature detector 32 and the Y-axis temperature detector 33 are connected in series between the wirings 66 and 69.

The pad 87 connects to the ground (or the power supply) outside the flow rate sensor 1, and the pad 88 connects to the power supply (or the ground) outside the flow rate sensor 1. Accordingly, the Y-axis temperature detector 32 and the Y-axis temperature detector 33 are connected in series between the ground and the power supply, and an intermediate potential can be obtained from the pad 86.

One end of the heat element 40 is connected to the pad 80 via the wiring 60, and the other end of the heat element 40 is connected to the pad 81 via the wiring 61. A current flows through the heat element 40 and the heat element 40 generates heat when a voltage is applied across the pad 80 and the pad 81.

Preferably, different kinds of materials are selected and used for a material forming the heat element 40 and a material forming wirings 60 and 61, so that a resistivity of the heat element 40 becomes higher than a resistivity of the wirings 60 and 61. Accordingly, power is concentrated at the heat element 40, and a temperature rise of the heat element 40 becomes large. As a result, a difference between the temperatures detected by the upstream temperature detector and the downstream temperature detector becomes large, to thereby improve a detection sensitivity of the flow rate.

The heat element 40 may be formed from platinum (Pt), nichrome (NiCr), polysilicon (p-Si), or the like, for example. In this case, aluminum (Al), gold (Au), or the like having a resistivity lower than resistivities of these heat element materials is preferably used for the wirings 60 and 61.

One end of the resistance thermometer sensor 50 is connected to the pad 80, and the other end of the resistance thermometer sensor 50 is connected to the pad 89. The resistance thermometer sensor 50 connects to a resistance bridge circuit outside the flow rate sensor 1, via the pads 80 and 89, and becomes one of resistors forming a bridge. According to this circuit structure, it is possible to detect a temperature of the fluid, based on a change in the resistance of the resistance thermometer sensor 50. The resistance thermometer sensor 50 may be formed from platinum (Pt), nichrome (NiCr), polysilicon (p-Si), or the like, for example.

[Layout of Each of Temperature Detectors, Heat Element, and Wirings in Thin Film Structure Part]

Layout features of the X-axis temperature detectors 30 and 31, the Y-axis temperature detectors 32 and 33, the heat element 40, the wirings 60 through 69, and the dummy wirings 70 and 71 in the thin film structure part 20t will be described.

In the thin film structure part 20t, the X-axis temperature detectors 30 and 31, the Y-axis temperature detectors 32 and 33, the wirings 60 through 69, and the dummy wirings 70 and 71 are arranged in point symmetry with respect to the heat element 40 in the plan view. In other words, the dummy wirings 70 and 71 are provided in order to make each of the elements within the thin film structure part 20t point symmetrical.

The point symmetrical layout described above not only includes a completely point symmetrical case, but also an approximately point symmetrical case that is point symmetrical within a range not impairing the effect of improving the detection sensitivity of the flow rate according to the present invention. The terms perpendicular, parallel, center, square shape, circular shape, diagonal, or the like are also used in a similar manner.

More particularly, the heat element 40 is arranged at a center of the diaphragm part 20 (a center of the thin film structure part 20t). In addition, the X-axis temperature detectors 30 and 31, and the Y-axis temperature detectors 32 and 33 are arranged equally in a periphery of the heat element 40. In other words, the X-axis temperature detectors 30 and 31, and the Y-axis temperature detectors 32 and 33 are arranged equidistant from the heat element 40. Moreover, the X-axis temperature detectors 30 and 31 that oppose each other via the heat element 40 are arranged in a direction parallel to the X-axis. Further, the Y-axis temperature detectors 32 and 33 that oppose each other via the heat element 40 are arranged in a direction parallel to the Y-axis.

In addition, the wiring 60 drawn out from one end of the heat element 40 and the wiring 61 drawn out from the other end of the heat element 40 are arranged on one diagonal line of the diaphragm part 20.

The wiring 63 drawn out from the X-axis temperature detector 30, and the wiring 69 drawn out from the Y-axis temperature detector 33 are arranged in parallel to the wiring 61, on both sides of the wiring 61 drawn out from the heat element 40. A gap between the wiring 61 and the wiring 63, and a gap between the wiring 61 and the wiring 69 are approximately the same.

Similarly, the wiring 64 drawn out from the X-axis temperature detector 31, and the wiring 67 drawn out from the Y-axis temperature detector 32 are arranged in parallel to the wiring 60, on both sides of the wiring 60 drawn out from the heat element 40. A gap between the wiring 60 and the wiring 64, and a gap between the wiring 60 and the wiring 67 are approximately the same.

The dummy wirings 70 and 71 are arranged on both sides of the heat element 40, on the other diagonal line of the diaphragm part 20.

The wiring 62 drawn out from the X-axis temperature detector 30, and the wiring 66 drawn out from the Y-axis temperature detector 32 are arranged in parallel to the dummy wiring 70, on both sides of the dummy wiring 70. A gap between the dummy wiring 70 and the wiring 62, and a gap between the dummy wiring 70 and the wiring 66 are approximately the same.

Similarly, the wiring 65 drawn out from the X-axis temperature detector 31, and the wiring drawn out from the Y-axis temperature detector 33 are arranged in parallel to the dummy wiring 71, on both sides of the dummy wiring 71. A gap between the dummy wiring 71 and the wiring 65, and a gap between the dummy wiring 71 and the wiring 68 are approximately the same.

The wirings drawn out from one end and the other end of the heat element 40 may be referred to as heat element wirings. The wirings drawn out from each of the temperature detectors may be referred to as temperature detector wirings.

Accordingly, the wirings 60, 64, and 67, and the wirings 61, 63, and 69 are arranged on one diagonal line of the diaphragm part 20, and the wirings 70, 62, and 66, and the wirings 71, 65, and 68 are arranged on the other diagonal line of the diaphragm part 20.

The reason why these wirings are arranged diagonally is because the fluid mainly flows on the X-axis and the Y-axis, but when the fluid flows on the wirings, the heat generated from the heat element is preferably uneasily radiated from the wirings. In other words, when the direction of the wiring is parallel to the X-axis or the Y-axis (in the direction of the fluid flow), the fluid flows on the wiring, and the heat generated from the heat element is radiated from the wiring. Hence, the wiring is made to extend in the direction not matching the direction of the fluid flow (on the X-axis or on the Y-axis).

It has been confirmed that thermal stress on the thin film structure part 20t concentrates at four regions (four stress concentrating parts B in FIG. 1) including a central part of each edge of the thin film structure part 20t (a part making contact with an inner edge part of the top surface of the semiconductor substrate 10).

Accordingly, in the flow rate sensor 1, the wirings 60 through 69, and the dummy wirings 70 and 71 are arranged in regions excluding the four stress concentrating parts. B. Because the wirings are arranged diagonally as described above, the wirings can easily be arranged to avoid the stress concentrating parts B.

A width of the wirings on the thin film structure part 20t is narrower than a width of the wirings in the periphery of the thin film structure part 20t (on the semiconductor substrate 10), and is on the order of 1 to 10 μm, for the purposes of stress relaxation. By arranging the wirings on the thin film structure part 20t having the narrow wiring width at positions avoiding the stress concentrating parts B, it is possible to reduce the possibility of the wiring breaking due to the thermal stress.

[Operation of Flow Rate Sensor]

Next, an operation of the flow rate sensor 1 will be described. It is assumed that the flow rate sensor 1 is connected to a predetermined control circuit. The control circuit may detect the temperature of the fluid based on the change in the resistance of the resistance thermometer sensor 50 to calculate a suitable heating value of the heat element 40, and apply a voltage based on the calculated heating value across the pad 80 and the pad 81 to cause the current to flow through the heat element 40 and generate heat.

In addition, by connecting the control circuit, the X-axis temperature detector 30 and the X-axis temperature detector 31 are connected in series between the ground and the power supply, and the intermediate potential (referred to as an intermediate potential X) can be obtained from the node part between the pad 82 and the pad 84, as described above. Further, the Y-axis temperature detector 32 and the Y-axis temperature detector 33 are connected in series between the ground and the power supply, and the intermediate potential (referred to as an intermediate potential Y) can be obtained from the pad 86.

When the current is caused to flow through the heat element 40 to generate heat, the temperature of the thin film structure part 20t rises. In this state, in a case in which the fluid (for example, air, gas, or the like) that is a detection target is not flowing, outputs of the X-axis temperature detector 30 and the X-axis temperature detector 31 are balanced, and an intermediate potential (referred to as an initial value $X_0$) between the ground and the power supply is obtained as the intermediate potential X. Similarly, outputs of the Y-axis temperature detector 32 and the Y-axis temperature detector 33 are balanced, and an intermediate potential (referred to as an initial value Yd between the ground and the power supply is obtained as the intermediate potential Y.

On the other hand, in a case in which the fluid flows on the surface of the flow rate sensor 1 (the top surface 20a of the diaphragm part 20), a temperature distribution is formed on the surface of the flow rate sensor 1 (the temperature on an upstream side becomes lower than on a downstream side). For this reason, the resistance of the temperature detectors arranged on the upstream side and the resistance of the temperature detectors arranged on the downstream side become unbalanced, and the intermediate potentials X and Y change.

The control circuit can detect the direction of the fluid flow in a 360° range, according to whether the intermediate potentials X and Y change towards the ground or the power supply with respect to the respective initial values $X_0$ and $Y_0$. In addition, the control circuit can measure the flow rate according to the amounts of change of the intermediate potentials X and Y with respect to the respective initial values $X_0$ and $Y_0$. A relationship of the direction of change and the amount of change of the intermediate potentials X and Y, with respect to the flow direction and the flow rate, may be stored within the control circuit in a form of a table, for example.

[Method of Manufacturing Flow Rate Sensor]

Next, a method of manufacturing the flow rate sensor 1 will be described. FIG. 3 through FIG. 10 are diagrams illustrating an example of manufacturing processes of the flow rate sensor. FIG. 3 through FIG. 10 illustrate cross sections corresponding to FIG. 2, and thus, a part of the constituent elements of the flow rate sensor 1 is not illustrated in these figures.

Figure 3:
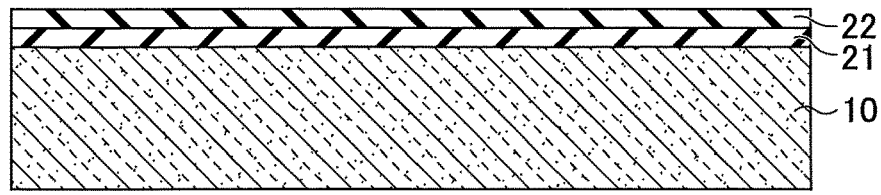
FIG. 3 is a diagram (part 1) illustrating an example of a manufacturing process of the flow rate sensor.

First, in the process illustrated in FIG. 3, the semiconductor substrate 10 formed by a silicon substrate or the like, is prepared, and the insulator layers 21 and 22 are successively stacked on the top surface of the semiconductor substrate 10. For example, a silicon oxide layer ($SiO_2$) or the like may be used for the insulator layer 21. For example, a silicon nitride layer ($Si_3N_4$) or the like may be used for the insulator layer 22. The insulator layers 21 and 22 may be formed by thermal oxidation, low-temperature CVD (Chemical Vapor Deposition), or the like, for example.

Figure 4:
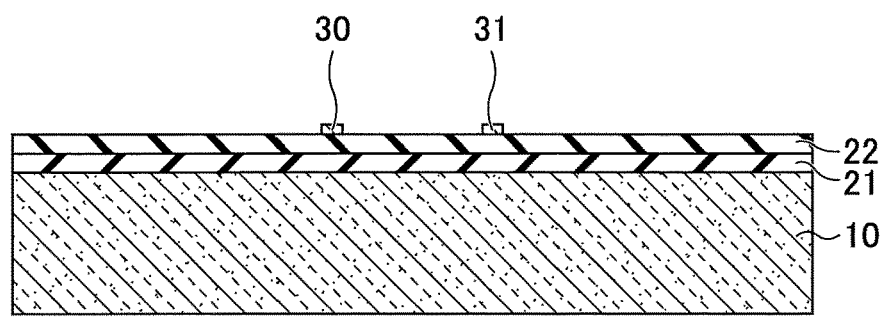
FIG. 4 is a diagram (part 2) illustrating the example of the manufacturing process of the flow rate sensor.

Next, in the process illustrated in FIG. 4, the X-axis temperature detectors 30 and 31, and the Y-axis temperature detectors 32 and 33 are formed on a top surface of the insulator layer 22. For example, vanadium oxide or the like may be used for the X-axis temperature detectors 30 and 31, and the Y-axis temperature detectors 32 and 33. The X-axis temperature detectors 30 and 31, and the Y-axis temperature detectors 32 and 33 may be formed by a sol-gel method or the like, for example.

In the case in which the sol-gel method is used, a sol-gel solution (precursor solution) that becomes the temperature detector is created, and a coated layer is formed on the entire top surface of the insulator layer 22 by spin-coating the sol-gel solution. Next, the coated layer is heated to evaporate a solvent, and dried to obtain a solid layer. Next, unwanted portions of the solid layer are removed by etching, to form the X-axis temperature detectors 30 and 31, and the Y-axis temperature detectors 32 and 33.

Because the sol-gel method forms the coated layer by spin-coating, a surface on which the coated layer is formed is preferably flat. Accordingly, the X-axis temperature detectors 30 and 31, and the Y-axis temperature detectors 32 and 33 are preferably formed on a layer lower than the layer on which the heat element 40, the wiring 62, or the like are formed. If the heat element 40 or the like were formed on the layer lower than the layer on which each of the temperature detectors are formed, undulations would remain on the surface of the insulator layer when the insulator layer is formed on the heat element 40 or the like, to deteriorate the flatness of the surface on which the coated layer is spin-coated, which is not preferable.

Figure 5:
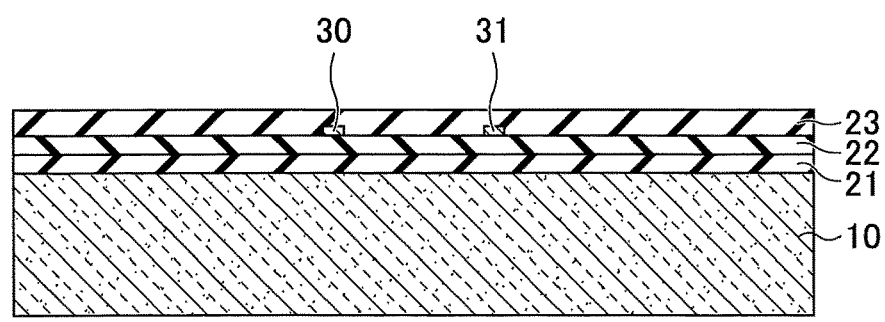
FIG. 5 is a diagram (part 3) illustrating the example of the manufacturing process of the flow rate sensor.

Next, in the process illustrated in FIG. 5, the insulator layer 23 is formed on the top surface of the insulator layer 22 so as to cover the X-axis temperature detectors 30 and 31, and the Y-axis temperature detectors 32 and 33. For example, a silicon oxide layer ($SiO_2$) or the like may be used for the insulator layer 23. The insulator layer 23 may be formed by sputtering, plasma CVD, or the like, for example.

Figure 6:
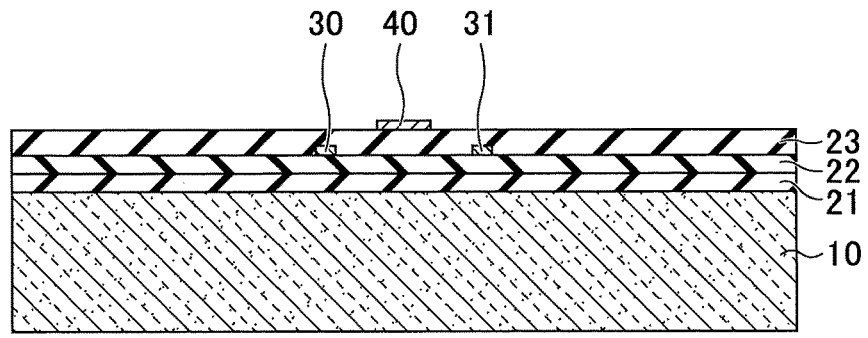
FIG. 6 is a diagram (part 4) illustrating the example of the manufacturing process of the flow rate sensor.

Next, in the process illustrated in FIG. 6, the heat element 40 and the resistance thermometer sensor 50 are formed on a top surface of the insulator layer 23. For example, platinum (Pt), nichrome (NiCr), polysilicon (p-Si), or the like may be used for the heat element 40 and the resistance thermometer sensor 50. The heat element 40 and the resistance thermometer sensor 50 may be formed by sputtering or the like, for example.

Figure 7:
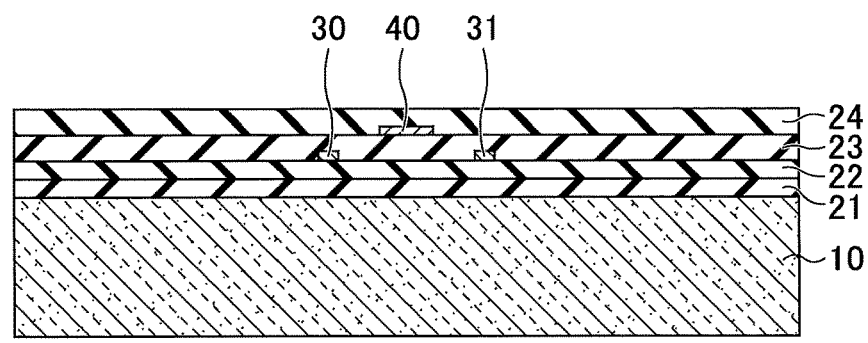
FIG. 7 is a diagram (part 5) illustrating the example of the manufacturing process of the flow rate sensor.

Next, in the process illustrated in FIG. 7, the insulator layer 24 is formed on a top surface of the insulator layer 23 so as to cover the heat element 40 and the resistance thermometer sensor 50. For example, silicon oxide layer ($SiO_2$) or the like may be used for the insulator layer 24. The insulator layer 24 may be formed by sputtering, plasma CVD, or the like, for example.

Figure 8:
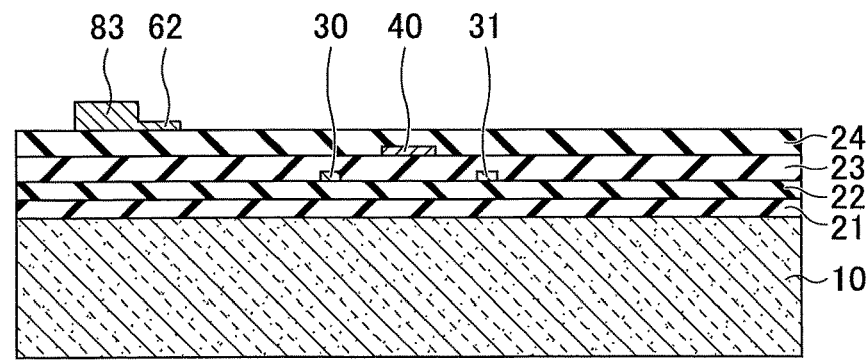
FIG. 8 is a diagram. (part 6) illustrating the example of the manufacturing process of the flow rate sensor.

Next, in the process illustrated in FIG. 8, the wirings 60 through 69, the dummy wirings 70 and 71, and the pads 80 through 89 are formed on a top surface of the insulator layer 24. For example, aluminum (Al), gold (Au), or the like may be used for the wirings 60 through 69, the dummy wirings 70 and 71, and the pads 80 through 89. The wirings 60 through 69, the dummy wirings 70 and 71, and the pads 80 through 89 may be formed by sputtering or the like, for example. The insulator layers are etched to form a contact hole at portions where the wirings 60 through 69 connect to the heat element 40 or the like in the lower layers. A vertical wiring made of aluminum (Al), gold (Cu), or the like is formed within the contact hole.

Figure 9:
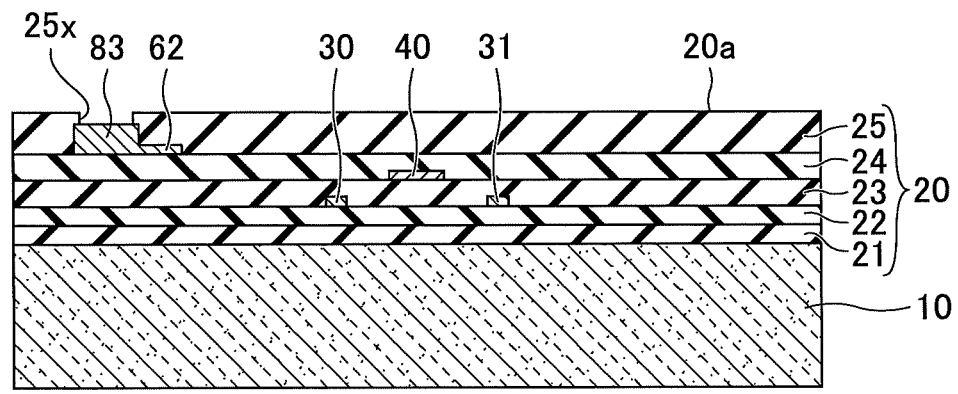
FIG. 9 is a diagram (part 7) illustrating the example of the manufacturing process of the flow rate sensor.

Next, in the process illustrated in FIG. 9, the insulator layer 25 is formed on a top surface of the insulator layer 24, so as to cover the wirings 60 through 69, the dummy wirings 70 and 71, and the pads 80 through 89. For example, a silicon oxide layer ($SiO_2$), a silicon nitride layer ($Si_3N_4$), or the like may be used for the insulator layer 25. The insulator layer 25 may be formed by sputtering, plasma CVD, or the like, for example. Thereafter, the opening 25x is formed in the insulator layer 25 by dry etching or the like, to expose at least a portion of the top surface of the pads 80 through 89 through the insulator layer 25.

Figure 10:
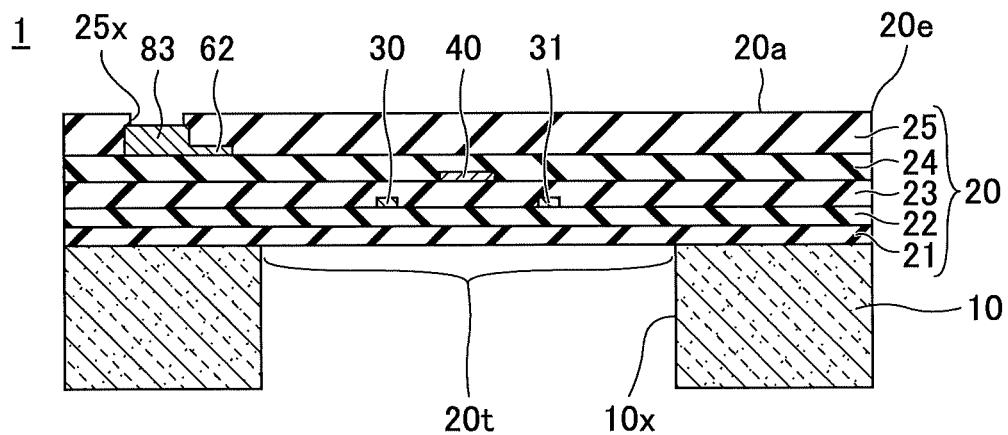
FIG. 10 is a diagram (part 8) illustrating the example of the manufacturing process of the flow rate sensor.

Next, in the process illustrated in FIG. 10, the opening 10x is formed at a central portion of the semiconductor substrate 10. Hence, a bottom surface of the insulator layer 21 is exposed within the opening 10x, to form the thin film structure part 20t. The opening 10x may be formed by DRIE (Deep Reactive Ion Etching), for example. The opening 10x may also be formed by wet etching using an etchant such as TMAH (Tetra-Methyl Ammonium Hydroxide, KOH (Potassium Hydroxide), or the like. The flow rate sensor 1 illustrated in FIG. 1 and FIG. 2 is completed by the processes described above.

The processes described above are used to manufacture a single flow rate sensor 1. However, more efficient processes may form a plurality of regions that become flow rate sensors 1 on a semiconductor wafer, and thereafter cut the semiconductor wafer into pieces by dicing or the like, to simultaneously form a plurality of flow rate sensors 1.

In the thin film structure part 20t of the flow rate sensor 1 in the first embodiment, the X-axis temperature detectors 30 and 31, the Y-axis temperature detectors 32 and 33, the wirings 60 through 69, and the dummy wirings 70 and 71 are arranged in point symmetry with respect to the heat element 40 in the plan view. Accordingly, the heat from the heat element 40 is uniformly transferred to the thin film structure part 20t, and an inconsistency in the temperature distribution becomes small with respect to the direction of the fluid flow (flow direction), to thereby improve the detection sensitivity of the flow rate.

In addition, by arranging the heat element wirings and the temperature detector wirings in parallel to each other, the heat generated from the heat element 40 is easily distributed on the thin film structure part 20t, and the difference between the temperatures detected by the upstream temperature detector and the downstream temperature detector becomes large, to thereby improve the detection sensitivity of the flow rate.

Further, by using different kinds of materials for the heat element 40 and the heat element wirings (wirings 60 and 61), and selecting the materials so that the resistivity of the heat element 40 becomes higher than the resistivity of the heat element wirings, the power is concentrated at the heat element 40, and the temperature rise of the heat element 40 becomes large. As a result, the difference between the temperatures detected by the upstream temperature detector and the downstream temperature detector becomes large, to thereby improve the detection sensitivity of the flow rate.

By not arranging the wirings at the stress concentrating parts B of the thin film structure part 20t, the effects of the thermal stress on the thin film structure part 20t is relaxed, and it is possible to improve mechanical strengths of the wirings and the thin film structure part.

In addition, by using vanadium oxide for each of the temperature detectors, it is possible to improve the detection sensitivity of the flow rate. It is also possible to reduce power consumption of the heat element, and reduce the size of the temperature detectors.

First Modification of First Embodiment

In a first modification of the first embodiment, an example of the thin film structure part is provided with slits. In the first modification of the first embodiment, a description of the same constituent parts already described in the embodiment may be omitted.

Figure 11:
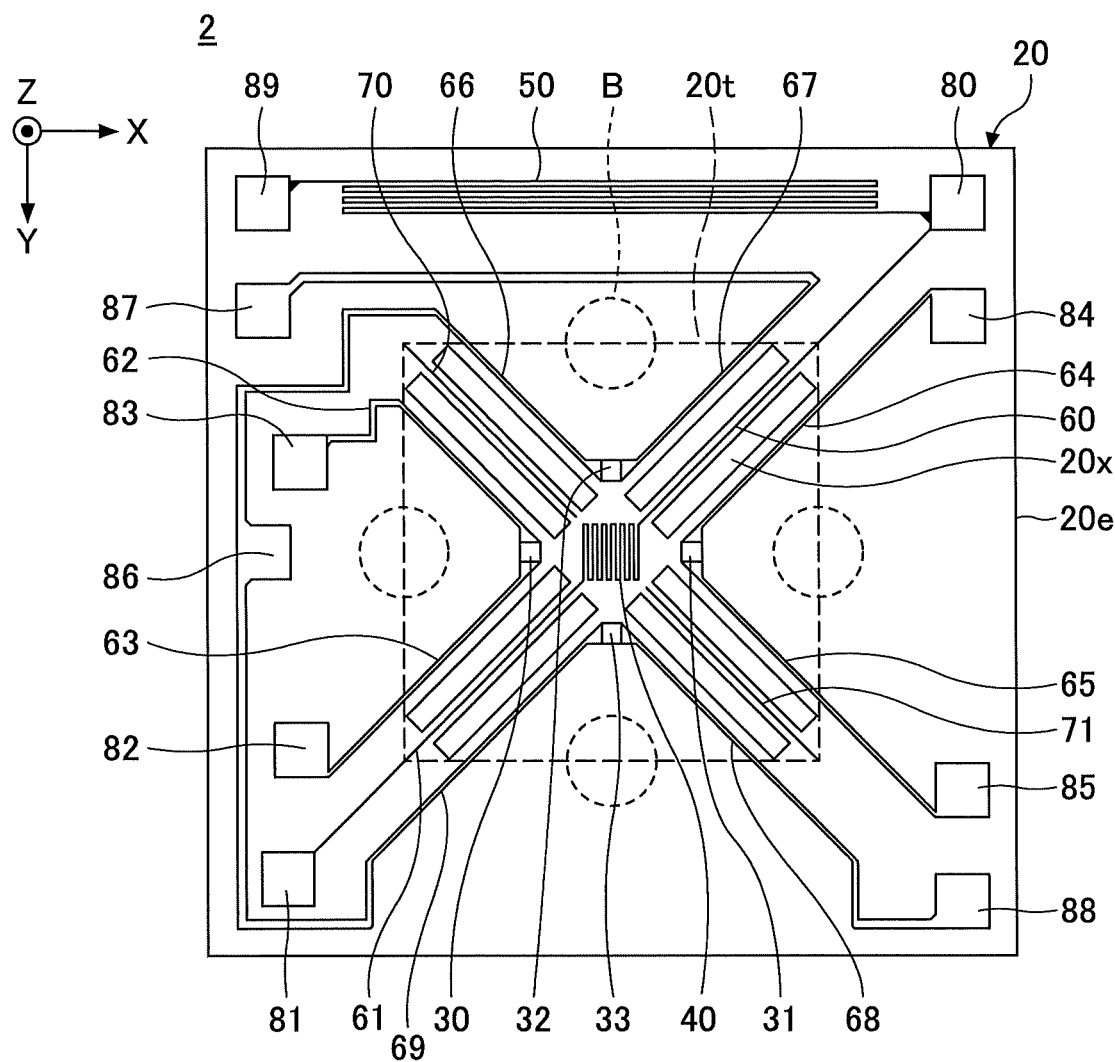
FIG. 11 is a perspective plan view illustrating an example of the flow rate sensor in a first modification of the first embodiment.

FIG. 11 is a perspective plan view illustrating an example of the flow rate sensor in the first modification of the first embodiment. As illustrated in FIG. 11, a flow rate sensor 2 differs from the flow rate sensor 1 (refer to FIG. 1) in that eight slits 20x are provided in the thin film structure part 20t. A planar shape of the slit 20x may be an elongated shape (for example, a rectangular shape, an oval shape, or the like), for example.

More particularly, the slit 20x is provided between the wiring 60 and each of the wirings 64 and 67 arranged in parallel to the wiring 60, on both sides of the wiring 60. In addition, the slit 20x is also provided between the wiring 61 and each of the wirings 63 and 69 arranged in parallel to the wiring 61, on both sides of the wiring 61.

Similarly, the slit 20x is provided between the dummy wiring 70 and each of the wirings 62 and 66 arranged in parallel to the dummy wiring 70, on both sides of the dummy wiring 70. Further, the slit 20x is also provided between the dummy wiring 71 and each of the wirings 65 and 68 arranged in parallel to the dummy wiring 71, on both sides of the dummy wiring 71.

By providing the slits 20x in the thin film structure part 20t in this manner, it is possible to reduce the heat capacity of the thin film structure part 20t. Hence, the temperature rise of the heat element 40 becomes large, and the difference between the temperatures detected by the upstream temperature detector and the downstream temperature detector becomes large, to thereby further improve the detection sensitivity of the flow rate. The slits may be provided symmetrically at other parts of the thin film structure part 20t.

Second Modification of First Embodiment

In a second modification of the first embodiment, an example of the thin film structure part has a different planar shape. In the second modification of the first embodiment, a description of the same constituent parts already described in the embodiment may be omitted.

Figure 12:
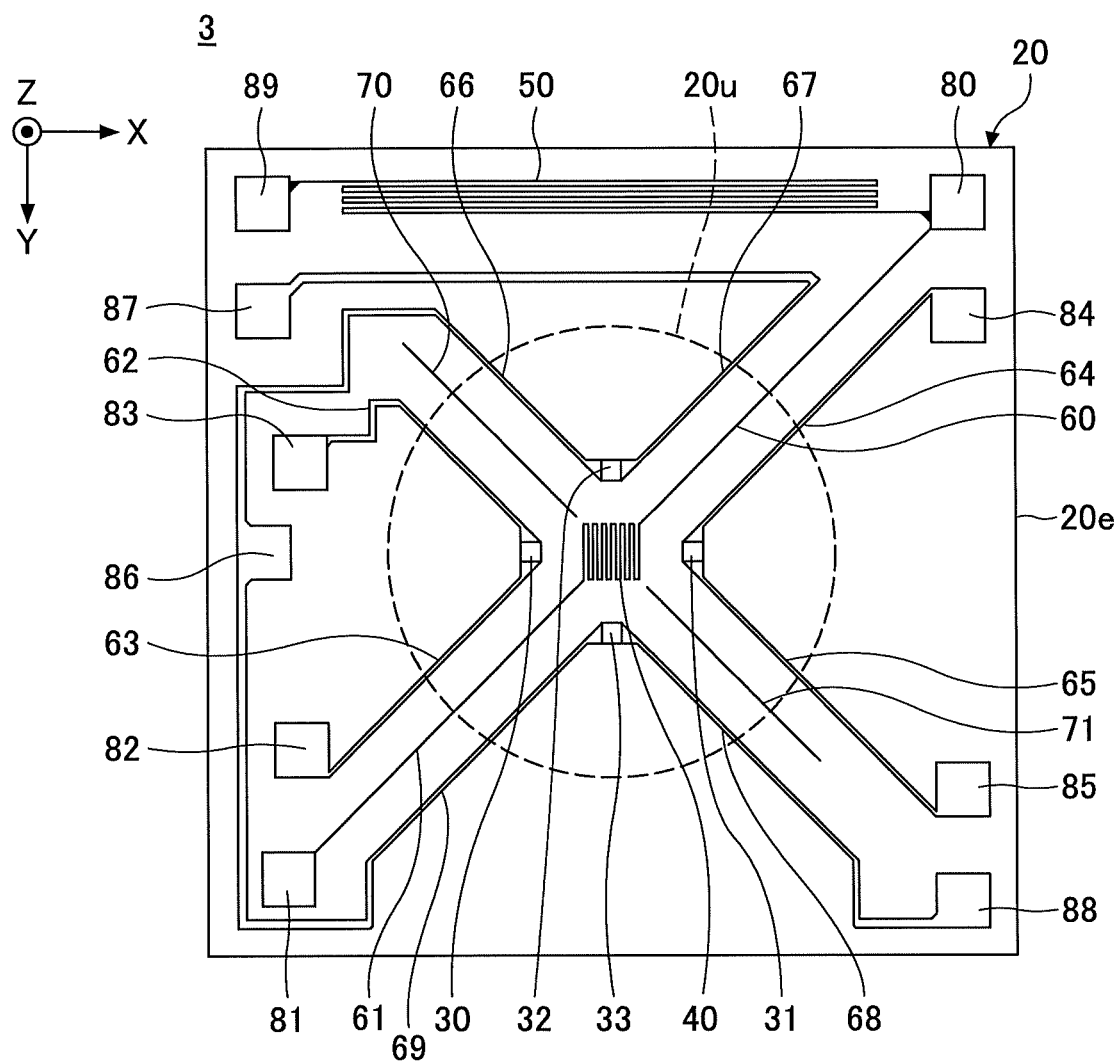
FIG. 12 is a perspective plan view illustrating an example of the flow rate sensor in a second modification of the first embodiment.

FIG. 12 is a perspective plan view illustrating an example of the flow rate sensor in the second modification of the first embodiment. As illustrated in FIG. 12, a flow rate sensor 3 differs from the flow rate sensor 1 (refer to FIG. 1) in that the thin film structure part 20t is substituted by a thin film structure part 20u.

In the flow rate sensor 3, the opening 10x of the semiconductor substrate 10 has a planar shape that is a circular shape. As a result, the thin film structure part 20u also has a planar shape that is a circular shape. The thin film structure part 20u has the circular planar shape, but is otherwise similar to the thin film structure part 20t.

By providing the thin film structure part 20u having the circular planar shape, no stress concentrating parts B is generated, and it is possible to further improve the mechanical strengths of the wirings and the thin film structure part.

Third Modification of First Embodiment

In a third modification of the first embodiment, an example of the flow rate sensor is uniaxial. In the third modification of the first embodiment, a description of the same constituent parts already described in the embodiment may be omitted.

Figure 13:
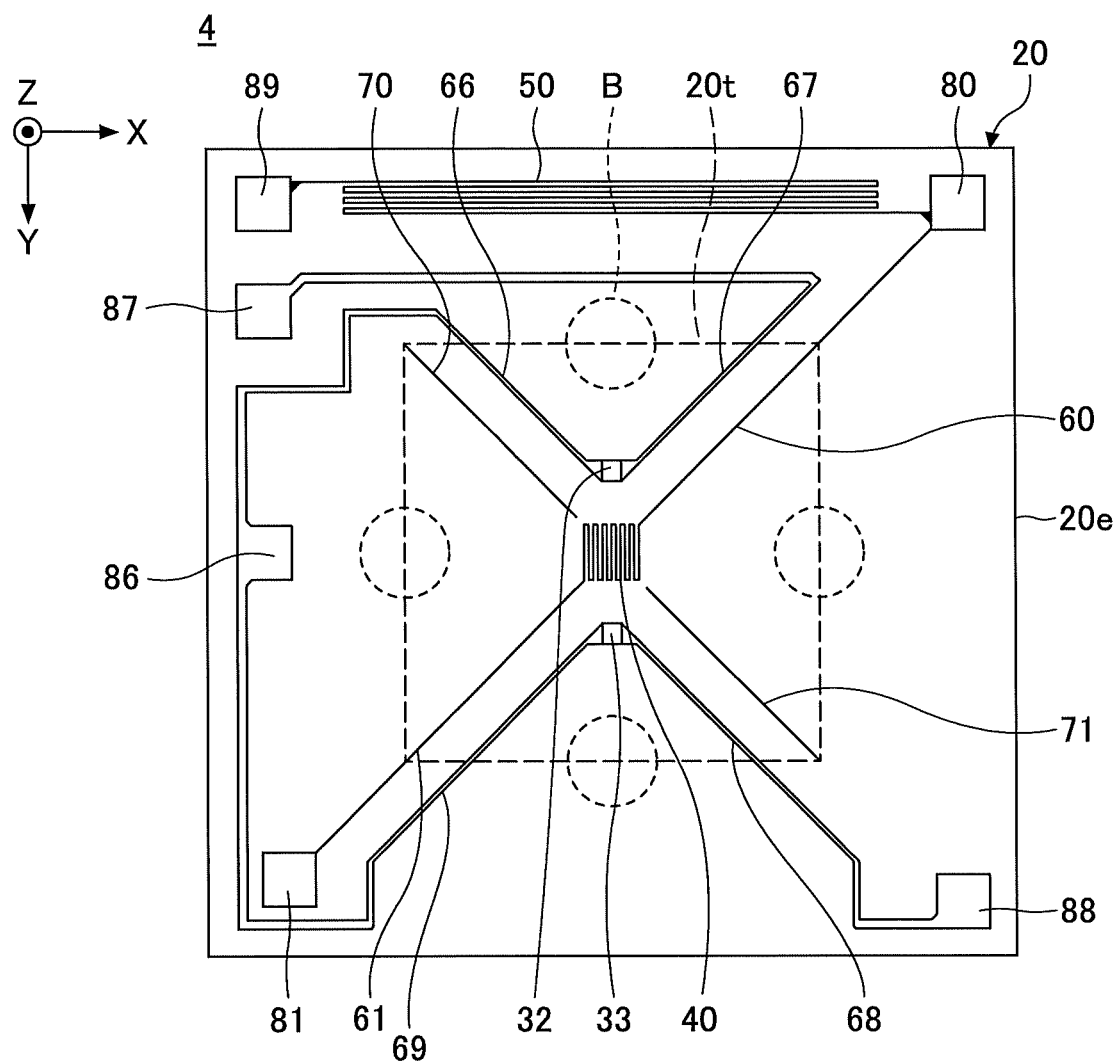
FIG. 13 is a perspective plan view illustrating an example of the flow rate sensor in a third modification of the first embodiment.

FIG. 13 is a perspective plan view illustrating an example of the flow rate sensor in the third modification of the first embodiment. As illustrated in FIG. 13, a flow rate sensor 4 differs from the flow rate sensor 1 (refer to FIG. 1) in that only the Y-axis temperature detectors 32 and 33 are arranged in the flow rate sensor 4, and no X-axis temperature detectors are provided. The flow rate sensor 4 can only detect the flow rate in the Y-axis direction. Hence, the flow rate sensor may be formed to be uniaxial.

Detailed description of preferable embodiments are described above. However, the present invention is not limited to the embodiments described above, and various variations and substitutions may be made to the embodiments described above without departing from the scope of the present invention.

This application is based upon and claims the benefit of priority of Japanese Patent Application No. 2015-194417 filed on Sep. 30, 2015, the entire contents of which are incorporated herein by reference.

DESCRIPTION OF THE REFERENCE NUMERALS 1, 2, 3, 4 Flow Rate Sensor
10 Semiconductor Substrate
10x, 25x Opening
20 Diaphragm Part
20a Top Surface of Diaphragm Part
20e Edge of Diaphragm Part
20t, 20u Thin Film Structure Part
20x Slit
21-25 Insulator Layer
30, 31 X-Axis Temperature Detector
32, 33 Y-Axis Temperature Detector
40 Heat Element
50 Resistance Thermometer Sensor
60-69 Wiring
70, 71 Dummy Wiring
80-89 Pad

The invention claimed is:

1. A flow rate sensor comprising:
a heat element;
a plurality of temperature detectors;
a semiconductor substrate having a frame shape with an opening; and
a diaphragm part provided on the semiconductor substrate,
wherein the plurality of temperature detectors and the heat element are provided on the diaphragm part,
wherein the diaphragm part has a thin film structure that covers the opening, a top surface, and a bottom surface in contact with the semiconductor substrate,
wherein the thin film structure has a stacked structure that includes a plurality of insulator layers that are successively stacked on the semiconductor substrate, the plurality of insulator layers including a first insulator layer, and a second insulator layer located further away from the semiconductor substrate than the first insulator layer,
wherein the plurality of temperature detectors are provided on the first insulator layer in a periphery of the heat element in a plan view viewed from above the diaphragm part in a first direction perpendicular to the top surface of the diaphragm part,
wherein the heat element is provided on the second insulator layer at a height position relative to the semiconductor substrate different from that of the plurality of temperature detectors, so that the second insulator layer separates the heat element from the plurality of temperature detectors along a direction, parallel to the first direction, in which the plurality of insulator layers of the stacked structure are stacked, and the heat element in the plan view is separated from each of the plurality of temperature detectors in a second direction, perpendicular to the first direction and parallel to the top surface of the diaphragm part,
wherein a flow rate of a fluid flowing on the plurality of temperature detectors is detected in a state in which the heat element generates heat, based on temperature detection results of each of the plurality of temperature detectors.

2. The flow rate sensor as claimed in claim 1, wherein the thin film structure has a circular shape in the plan view.

3. The flow rate sensor as claimed in claim 1, wherein each of the plurality of temperature detectors includes a sol-gel layer made of vanadium oxide.

4. The flow rate sensor as claimed in claim 1, wherein each of the plurality of temperature detectors includes a sol-gel layer made of vanadium oxide.

5. The flow rate sensor as claimed in claim 1, wherein the thin film structure has a square shape in the plan view, and further comprising:
heat element wirings, respectively drawn out from one end and another of the heat element, arranged on one diagonal line of the square shape of the diaphragm part.

6. The flow rate sensor as claimed in claim 5, further comprising:
temperature detector wirings, respectively drawn out from one end and another end of each of the plurality of temperature detectors, and arranged in parallel to the respective heat element wirings, on both sides of the respective heat element wirings.

7. The flow rate sensor as claimed in claim 1, wherein, in the thin film structure, the plurality of temperature detectors and temperature detector wirings drawn out from the plurality of temperature detectors are arranged point symmetrically to the heat element.

8. The flow rate sensor as claimed in claim 7, wherein the plurality of temperature detectors include four temperature detectors arranged equidistant from the heat element.

9. The flow rate sensor as claimed in claim 8, wherein the diaphragm part has a square shape in the plan view, the heat element is arranged at a center of the diaphragm part in the plan view, and
two mutually opposing temperature detectors are arranged in a direction parallel to a X-axis, and other two mutually opposing temperature detectors are arranged in a direction parallel to a Y-axis, where the X-axis is parallel to one of four edges of the diaphragm part, and the Y-axis is perpendicular to the X-axis within a plane parallel to the top surface of the diaphragm part.

10. The flow rate sensor as claimed in claim 9, wherein, in the thin film structure,
heat element wirings, respectively drawn out from one end and another of the heat element, are arranged on one diagonal line of the diaphragm part, and
the temperature detector wirings include wirings arranged in parallel to the respective heat element wirings, on both sides of the respective heat element wirings.

11. The flow rate sensor as claimed in claim 10, wherein a resistivity of the heat element is higher than a resistivity of the heat element wirings.

12. The flow rate sensor as claimed in claim 10, wherein, in the thin film structure,
dummy wirings are arranged on another diagonal line of the diaphragm part, on both sides of the heat element, and
the temperature detector wirings include wirings arranged in parallel to the respective dummy wirings, on both sides of the respective dummy wirings.

13. The flow rate sensor as claimed in claim 12, further comprising:
a first slit provided between the respective heat element wirings and wirings arranged in parallel to the respective heat element wirings, on both sides of the respective heat element wirings; and
a second slit provided between the respective dummy wirings and wirings arranged in parallel to the respective dummy wirings, on both sides of the respective dummy wirings.

14. The flow rate sensor as claimed in claim 10, wherein the heat resistor wirings and the temperature detector wirings are arranged in regions excluding stress concentrating parts.

15. The flow rate sensor as claimed in claim 14, wherein the thin film structure has a square shape in the plan view, and
the stress concentrating parts are located at four regions including a central part of each edge of the thin film structure.

16. A flow rate sensor comprising:
a heat element;
a plurality of temperature detectors;
a semiconductor substrate having a frame shape with an opening; and
a diaphragm part provided on the semiconductor substrate,
wherein the plurality of temperature detectors and the heat element are provided on the diaphragm part,
wherein the diaphragm part has a thin film structure that covers the opening,
wherein the thin film structure has a stacked structure that includes
a plurality of insulator layers, including a first insulator layer, and a second insulator layer located further away from the semiconductor substrate than the first insulator layer,
heat element wirings respectively drawn out from one end and another of the heat element, and
a plurality of temperature detector wirings, including wirings arranged in parallel to the respective heat element wirings, on both sides of the respective heat element wirings,
wherein the plurality of temperature detectors are arranged on the first insulator layer in a periphery of the heat element in a plan view,
wherein the heat element is arranged on the second insulator layer, and
wherein a flow rate of a fluid flowing on the plurality of temperature detectors is detected in a state in which the heat element generates heat, based on temperature detection results of each of the plurality of temperature detectors.

17. The flow rate sensor as claimed in claim 16, wherein a resistivity of the heat element is higher than a resistivity of the heat element wirings.

18. The flow rate sensor as claimed in claim 16, wherein the staked structure of the thin film structure further includes
dummy wirings arranged on another diagonal line of the diaphragm part, on both sides of the heat element,
wherein the temperature detector wirings include wirings arranged in parallel to the respective dummy wirings, on both sides of the respective dummy wirings.

19. The flow rate sensor as claimed in claim 18, further comprising:
a first slit provided between the respective heat element wirings and wirings arranged in parallel to the respective heat element wirings, on both sides of the respective heat element wirings; and
a second slit provided between the respective dummy wirings and wirings arranged in parallel to the respective dummy wirings, on both sides of the respective dummy wirings.

20. The flow rate sensor as claimed in claim 16, wherein the heat resistor wirings and the temperature detector wirings are arranged in regions excluding stress concentrating parts.

21. The flow rate sensor as claimed in claim 20, wherein the thin film structure has a square shape in the plan view, and
the stress concentrating parts are located at four regions including a central part of each edge of the thin film structure.

22. A flow rate sensor comprising:
a heat element;
a plurality of temperature detectors;
a semiconductor substrate having a frame shape with an opening; and
a diaphragm part provided on the semiconductor substrate,
wherein the plurality of temperature detectors and the heat element are provided on the diaphragm part,
wherein the plurality of temperature detectors are arranged in a periphery of the heat element in a plan view,
wherein the diaphragm part has a thin film structure that covers the opening,
wherein the thin film structure includes
heat element wirings, respectively drawn out from one end and another of the heat element, and
a plurality of temperature detector wirings including wirings arranged in parallel to the respective heat element wirings,
wherein the heat resistor wirings and the temperature detector wirings are arranged in regions excluding stress concentrating parts, and wherein a flow rate of a fluid flowing on the plurality of temperature detectors is detected in a state in which the heat element generates heat, based on temperature detection results of each of the plurality of temperature detectors.

23. The flow rate sensor as claimed in claim 22, wherein the thin film structure of the diaphragm part further includes
a plurality of insulator layers that are successively stacked on the semiconductor substrate,
wherein the plurality of insulator layers include a first insulator layer, a second insulator layer located further away from the semiconductor substrate than the first insulator layer, and a third insulator layer located further away from the semiconductor substrate than the second insulator layer, and
wherein the heat element wirings and the plurality of temperature detector wirings are provided on the third insulator layer.

24. A flow rate sensor comprising:
a heat element;
a plurality of temperature detectors including a sol-gel layer made of vanadium oxide, respectively;
a semiconductor substrate having a frame shape with an opening; and
a diaphragm part provided on the semiconductor substrate,
wherein the plurality of temperature detectors and the heat element are provided on the diaphragm part,
wherein the diaphragm part has a thin film structure that covers the opening, a top surface, and a bottom surface in contact with the semiconductor substrate,
wherein the thin film structure has a stacked structure that includes a plurality of insulator layers that are successively stacked on the semiconductor substrate, the plurality of insulator layers including a first insulator layer, and a second insulator layer located further away from the semiconductor substrate than the first insulator layer,
wherein the plurality of temperature detectors are provided on the first insulator layer in a periphery of the heat element in a plan view viewed from above the diaphragm part in a first direction perpendicular to the top surface of the diaphragm part,
wherein the heat element is provided on the second insulator layer at a height position relative to the semiconductor substrate different from that of the plurality of temperature detectors, so that the second insulator layer separates the heat element from the plurality of temperature detectors along a direction, parallel to the first direction, in which the plurality of insulator layers of the stacked structure are stacked, and the heat element in the plan view is separated from each of the plurality of temperature detectors in a second direction, perpendicular to the first direction and parallel to the top surface of the diaphragm part, and
wherein a flow rate of a fluid flowing on the plurality of temperature detectors is detected in a state in which the heat element generates heat, based on temperature detection results of each of the plurality of temperature detectors.

25. The flow rate sensor as claimed in claim 24, wherein the thin film structure has a square shape in the plan view, and further comprising:
heat element wirings, respectively drawn out from one end and another of the heat element, arranged on one diagonal line of the square shape of the diaphragm part.

26. The flow rate sensor as claimed in claim 25, further comprising:
temperature detector wirings, respectively drawn out from one end and another end of each of the plurality of temperature detectors, and arranged in parallel to the respective heat element wirings, on both sides of the respective heat element wirings.

* * * * *